(12) United States Patent
Lehmann Madsen

(10) Patent No.: US 11,685,081 B2
(45) Date of Patent: Jun. 27, 2023

(54) CONNECTION OF MOULD PARTS

(71) Applicant: LM Wind Power International Technology II ApS, Kolding (DK)

(72) Inventor: Kristian Lehmann Madsen, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 0 days.

(21) Appl. No.: 17/861,526

(22) Filed: Jul. 11, 2022

(65) Prior Publication Data

US 2022/0339823 A1    Oct. 27, 2022

Related U.S. Application Data

(62) Division of application No. 16/965,520, filed as application No. PCT/EP2019/052494 on Feb. 1, 2019, now Pat. No. 11,446,846.

(30) Foreign Application Priority Data

Feb. 1, 2018    (EP) .................................... 18154758

(51) Int. Cl.
*B29C 70/44* (2006.01)
*B29C 33/30* (2006.01)
(Continued)

(52) U.S. Cl.
CPC ............ *B29C 33/306* (2013.01); *B29C 70/48* (2013.01); *B29L 2031/085* (2013.01)

(58) Field of Classification Search
CPC ... B29C 33/301; B29C 33/302; B29C 33/306; B29C 70/44; B29C 70/443
See application file for complete search history.

(56) References Cited

U.S. PATENT DOCUMENTS 2,019,653 A    11/1935  Buyer
2,664,593 A    1/1954   Larson
(Continued)

FOREIGN PATENT DOCUMENTS

WO    2016011655 A1    1/2016
WO    2016066816 A1    5/2016

OTHER PUBLICATIONS

Afendi M, et al., Bubble free resin for infusion process:, Composites Part A, Elsevier, Amsterdam, NL, vol. 36, No. 6, Jun. 1, 2005 (Jun. 1, 2005), pp. 739-746, XP027846587, ISSN: 1359-835X.
(Continued)

*Primary Examiner* — Matthew J Daniels
(74) *Attorney, Agent, or Firm* — Nath, Goldberg & Meyer; Jerald L. Meyer; Tanya E. Harkins

(57) ABSTRACT

Disclosed is a method, a mould system and a mould part for a mould system, for manufacture of a component for a wind turbine blade. The mould part may have a moulding surface with a primary side section, a secondary side section, and a central portion between the primary side section and the secondary side section. The mould part has a primary connection interface configured to abut a secondary connection interface of a second mould part. The primary connection interface comprises a primary connection surface substantially perpendicular to the moulding surface. The primary connection interface comprising an outlet configured to be connected to a vacuum source.

6 Claims, 7 Drawing Sheets

(51) Int. Cl.
*B29C 70/48* (2006.01)
*B29L 31/08* (2006.01)

(56) References Cited

U.S. PATENT DOCUMENTS

| | | | |
|---|---|---|---|
| 3,171,163 | A | 3/1965 | Ford et al. |
| 5,022,845 | A | 6/1991 | Charleson et al. |
| 6,039,319 | A | 3/2000 | Coonce et al. |
| 7,223,091 | B2 | 5/2007 | Olsen et al. |
| 8,951,457 | B2 | 2/2015 | Galdeano et al. |
| 11,091,245 | B2 | 8/2021 | Lage |
| 2003/0091679 | A1 | 5/2003 | Aramburu et al. |
| 2008/0289282 | A1 | 11/2008 | MacDonald |
| 2008/0302486 | A1* | 12/2008 | Jones ............... B29C 33/76 156/475 |
| 2009/0214890 | A1* | 8/2009 | Lowney ............. B22D 17/22 228/208 |
| 2010/0000667 | A1 | 1/2010 | Funnell |
| 2010/0032862 | A1* | 2/2010 | Micheaux ........... B29C 33/38 264/219 |
| 2012/0061024 | A1 | 3/2012 | Starke |
| 2012/0090789 | A1* | 4/2012 | Starke ............... B29C 33/301 264/219 |
| 2012/0175807 | A1* | 7/2012 | Galdeano ........... F03D 1/0675 425/340 |
| 2012/0187273 | A1 | 7/2012 | Mironov |
| 2012/0211637 | A1* | 8/2012 | Christiansen ....... B29C 33/306 249/102 |
| 2012/0267828 | A1* | 10/2012 | Halford ............. B29C 33/302 264/327 |
| 2014/0327178 | A1 | 11/2014 | Davis et al. |
| 2017/0036375 | A1* | 2/2017 | Gerdisch ........... B29C 33/3842 |
| 2017/0274563 | A1* | 9/2017 | De Waal Malefijt ....... B29C 33/3835 |

OTHER PUBLICATIONS

Brouwer W D, et al., "Vacuum injection moulding for large structural applications", Composites Part A, Elsevier, Amsterdam, NL, vol. 34, No. 6, Jun. 1, 2003 (Jun. 1, 2003), pp. 551-558, XP004428282, ISSN: 1359-835X, DOI: 10.1016/S1359-835X(03)00060-5.

Post, B.K. et al., Big Area Additive Manufacturing Application in Wind Turbine Molds, Solid Freeform Fabrication 2017: Proceedings of the 28th Annual International Solid Freeform Fabrication Symposium (2017), pp. 2430-2446. (Year: 2017).

* cited by examiner

CONNECTION OF MOULD PARTS

This is a Divisional Application of U.S. patent application Ser. No. 16/965,520, filed Jul. 28, 2020, an application filed as a national stage under 371 of Application No. PCT/EP2019/052494 filed Feb. 1, 2019 and claiming benefit from European Application No. 18154758.9, filed Feb. 1, 2018, the content of each of which is hereby incorporated by reference in its entirety.

FIELD OF THE INVENTION

The present disclosure relates to connection of mould parts of a mould to form a mould for moulding of a component for a wind turbine blade, such as a shell part or a shear-web, such as an I-web or a C-web, in particular a mould for vacuum assisted resin transfer.

BACKGROUND

A wind turbine blade is typically assembled by a number of components. For example, a typical wind turbine blade is manufactured by moulding individual shell halves, shear webs etc.

A wind turbine blade is typically strengthened by adding shear-webs on the inside of the wind turbine blade along the length of the wind turbine blade. The shear-webs may e.g. be formed in the shape of an I-beam, i.e. an I-web or in the shape of a C, i.e. a C-web.

The shear web may be almost as long as the wind turbine blade. Thus, the mould for moulding the shear-web may exceed 70 meters in length. The mould may be sectionised, in particular in the longitudinal or spanwise direction of the mould. The sectionised mould may be assembled such that the shear web may be manufactured as a unitary structure.

In using a vacuum assisted resin transfer moulding method, the mould should preferably be air tight. Hence, in using a sectionised mould interfaces between sections may be potential sources for formation of leaks.

SUMMARY

It is an object of the present disclosure to provide methods and devices for eliminating or at least reducing the formation of leaks in using a sectionised mould for the moulding of components for a wind turbine blade, such as shear-webs or shell parts, in particular in using vacuum assisted resin transfer moulding (VARTM).

Thus, the present invention relates to a mould part, such as a first mould part, for a mould system, such as a mould system for manufacture of a component for a wind turbine blade.

The mould part has a moulding surface with a primary side section a secondary side section, and a central portion between the primary side section and the secondary side section.

The mould part has a primary connection interface configured to abut a secondary connection interface of a second mould part. The mould part may have a secondary connection interface configured to abut a primary connection interface of a tertiary mould part.

The primary connection interface comprises a primary connection surface, e.g. substantially perpendicular to the moulding surface. The secondary connection interface may comprise a secondary connection surface, e.g. substantially perpendicular to the moulding surface. The secondary connection surface may be opposite the primary connection surface.

The primary connection interface comprises an outlet configured to be connected to a vacuum source, such as a vacuum source of a mould system.

Also disclosed is a mould system, such as a mould system for manufacture of a component for a wind turbine blade. The mould system comprises a first mould part, such as the mould part as disclosed, and a second mould part, such as the mould part as disclosed.

The first mould part has a first moulding surface with a first primary side section a first secondary side section and a first central portion between the first primary side section and the first secondary side section.

The first mould part has a first primary connection interface comprising a first primary connection surface, e.g. substantially perpendicular to the first moulding surface. The first primary connection interface comprises a first outlet configured to be connected to a vacuum source, such as a vacuum source of the mould system. The first mould part may have a first secondary connection interface comprising a first secondary connection surface, e.g. substantially perpendicular to the first moulding surface. The first secondary connection surface may be opposite the first primary connection surface.

The second mould part has a second moulding surface with a second primary side section a second secondary side section and a second central portion between the second primary side section and the second secondary side section.

The second mould part has a second secondary connection interface comprising a second secondary connection surface, e.g. substantially perpendicular to the second moulding surface. The second mould part may have a second primary connection interface comprising a second primary connection surface, e.g. substantially perpendicular to the second moulding surface. The second primary connection surface may be opposite the second secondary connection surface. The second primary connection interface may comprise a second outlet configured to be connected to a vacuum source, such as the vacuum source of the mould system.

The first primary connection interface is configured to abut the second secondary connection interface. The first secondary connection interface may be configured to abut a third primary connection interface of a third mould part. The second primary connection interface may be configured to abut a fourth secondary connection interface of a fourth mould part.

Also disclosed is a method for assembling a mould system, such as a mould system for manufacture of a component for a wind turbine blade, such as the disclosed mould system. Wherein the mould system comprises a first mould part and a second mould part.

The method comprises: positioning the first mould part and the second mould part such that the first primary connection interface abuts the second secondary connection interface and applying a first negative pressure to the first outlet by the vacuum source, such as a vacuum source of the mould system, such as to create a negative pressure between the first primary connection interface and the second secondary connection interface.

Also disclosed is a method for manufacture of a component for a wind turbine blade. The method comprises: positioning a first mould part and a second mould part such that a first primary connection interface of the first mould part abuts a second secondary connection interface of the second mould part; applying a first negative pressure between the first primary connection interface and the second secondary connection interface; and applying a second negative pressure between a sealing layer and the first moulding surface and the second moulding surface. The first negative pressure may be lower than the second negative pressure.

In connecting a plurality of mould parts to form a complete mould or mould system, there is an increased risk that the complete mould surface may not be completely air-tight. In particular, the interfaces between mould parts provides areas of increased risk of leakage. The present disclosure provides a way of connecting the mould parts by applying a low pressure or vacuum in the interface between connecting mould parts.

It is an advantage of the disclosure, that a tighter, e.g. more air-tight, connection between mould parts may be achieved.

Furthermore, the disclosure provides the advantage that in case of leaks, air entering the moulding process may be reduced and/or prevented. Thereby, the resulting component may be of a higher quality, and rate of defective components from the manufacturing process may be lowered.

The component may be a shear web or the component may be a shell part. The mould system and/or mould part(s) may be for manufacture of a shear web for a wind turbine blade. Alternatively, the mould system and/or mould part(s) may be for manufacture of a shell part, such as a half shell, for a wind turbine blade.

The mould system and/or the mould part(s) may be used for vacuum assisted resin transfer moulding (VARTM) of the component, such as by applying a second negative pressure between a sealing layer and a moulding surface, such as the first moulding surface and/or the second moulding surface. The first negative pressure may be lower than the second negative pressure. For example, the first negative pressure may be set to a lower negative pressure than the second negative pressure. By providing a lower pressure in the interface between mould parts, in case of any leaks, resin is drawn from the moulding process and into the interface rather than air being sucked from the interface an into the moulding process. The first negative pressure may be a predetermined fraction of the second negative pressure. For example, the first negative pressure may be adapted to be the predetermined fraction of the second negative pressure. The predetermined fraction may be between 0.1-90 percent, such as between 20-80 percent, such as between 50-75 percent. The second negative pressure may be between 10-500 mbar, such as between 10-300 mbar, such as between 100-300 mbar or such as between 10-50 mbar. The first negative pressure may be between 0.1-200 mbar, such as between 0.1-100 mbar, such as between 0.1-50 mbar. The difference between the first negative pressure and the second negative pressure may be more than 1 mbar, such as more than 10 mbar, such as more than 50 mbar.

It will be understood that any features explained in relation to one aspect of the disclosure is applicable also to any other aspect of the disclosure. For example, it will be understood that any of the features as explained in relation to any mould part may apply to a mould part, such as the first mould part and/or the second mould part, of the disclosed method or mould system.

The central portion may be substantially flat, such as for moulding of a shear web. Alternatively, the central portion may be arc-shaped, such as for moulding of a shell part, such as a half-shell.

The side sections, such as the primary side section and/or the secondary side section may comprise a base portion and/or a ramp portion. For example, the primary side section may comprise a primary base portion and/or a primary ramp portion. Alternatively, or additionally the secondary side section may comprise a secondary base portion and/or a secondary ramp portion. The side sections may be configured for adhering the sealing layer to allow application of the second negative pressure between the sealing layer and the moulding surface, such as the first moulding surface and/or the second moulding surface. The sealing layer may be adhered to the side section by use of double sided tape, such as sealant tape.

The base portion(s), such as the primary base portion and/or the secondary base portion, may be substantially parallel to the central portion. The base portion(s) may be positioned at a lower (vertical) level than the central portion. The ramp portion(s), such as the primary ramp portion and/or the secondary ramp portion, may join the central portion and/or the base portion. The ramp portion(s), such as the primary ramp portion and/or the secondary ramp portion, may be non-parallel, such as substantially perpendicular, to the central portion.

The outlet may extend through the primary connection surface. Thereby the vacuum source may be attached, for example, to the outlet from behind the primary connection surface, to allow for pressurisation of the cavity formed between the primary connection surface of the first connection interface of the first mould part and the secondary connection surface of the secondary connection interface of the second mould part.

The primary connection interface and/or the secondary connection interface may comprise a sealing path. The sealing path may surround the outlet. Thereby, attaching a vacuum source to the outlet, the pressure in the cavity formed by the primary connection surface of the first connection interface of the first mould part and the secondary connection surface of the secondary connection interface of the second mould part may be more effectively lowered.

The sealing path may comprise a plurality of sealing parts, e.g. including a first sealing part, a second sealing part, a third sealing part and/or a fourth sealing part. For example, the sealing path may comprise a first sealing part, a second sealing part, a third sealing part and/or a fourth sealing part.

A sealing part of the sealing path, such as the first sealing part and/or the fourth sealing part may be substantially parallel to the central portion. The first sealing part may be extending from the primary side section to the secondary side section, such as from the primary ramp portion to the secondary ramp portion. The fourth sealing part may be extending from the primary side section to the secondary side section, such as from a primary (e.g. left) outer perimeter of the primary connection surface to a secondary (e.g. right) outer perimeter of the primary connection surface.

The sealing path and/or a sealing part of the sealing path, such as the first sealing part and/or the fourth sealing part, may comprise a recess for receiving a gasket material, such as an elastic gasket material, such as a rubber gasket material. The gasket material may be removable from the recess. For example, the gasket material may be removed to allow for cleaning and/or for replacing.

The first sealing part may be offset from the central portion by a distance, such as a distance of more than 1 mm, such as a distance between 1-50 mm, such as between 5-40 mm, such as between 10-25 mm.

The fourth sealing part may be offset from a bottom perimeter of the primary connection surface by a distance, such as a distance of more than 1 mm, such as a distance between 1-50 mm, such as between 5-40 mm, such as between 10-25 mm.

The sealing path and/or a sealing part of the sealing path, such as the second sealing part and/or the third sealing part, may be configured for receiving a sealant paste. For example, the sealing path and/or the sealing part of the sealing path, such as the second sealing part and/or the third sealing part, may be formed by a bevelled edge, such as a bevelled edge configured to receive a sealant paste. The sealing part of the sealing path, such as the second sealing part and/or the third sealing part may be formed, e.g. by a bevelled edge, such as a bevelled edge configured to receive a sealant paste, between the moulding surface and the primary connection surface, such as between the primary side section and the primary connection surface and/or between the secondary side section and the primary connection surface. For example, the second sealing part may be between the primary side section and the primary connection surface, and/or the third sealing part may be between the secondary side section and the primary connection surface. Utilization of a sealing path and/or a sealing part of the sealing path configured for receiving a sealant paste, such as a bevelled edge, may be particularly advantageous for surfaces whereon it is intended to adhere the sealing layer for application of the second negative pressure between the sealing layer and the moulding surface, such as the first moulding surface and/or the second moulding surface. For example, the sealant paste received in such sealing path or sealing part of such sealing path, such as in the second sealing part and/or the third sealing part, may be configured to be coupled to the sealant tape adhering to the sealing layer. Thereby the connection of the mould parts reduce the risk of leakage around the interface between the sealing layer and the interface between mould parts.

The method may comprise applying a sealant paste to a sealing part of the sealing path configured for receiving a sealant paste, such as the second sealing part and/or the third sealing part.

The primary connection interface may comprise one or more bolts and/or bolt holes, e.g. extending through the primary connection surface. The bolts and/or bolt holes may provide for a fastening of the primary connection interface to the secondary connection interface of the second mould part. The secondary connection interface may comprise one or more bolts and/or bolt holes, such as to facilitate fastening to a primary connection interface of a third mould.

The one or more bolts and/or bolt holes may be surrounded by one or more fifth sealing parts. Thereby, leaks caused by the bolts and/or bolt holes may be reduced, facilitating a more effective pressurisation of the cavity formed between the primary connection surface and the secondary connection surface of the secondary connection interface of the second mould part.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
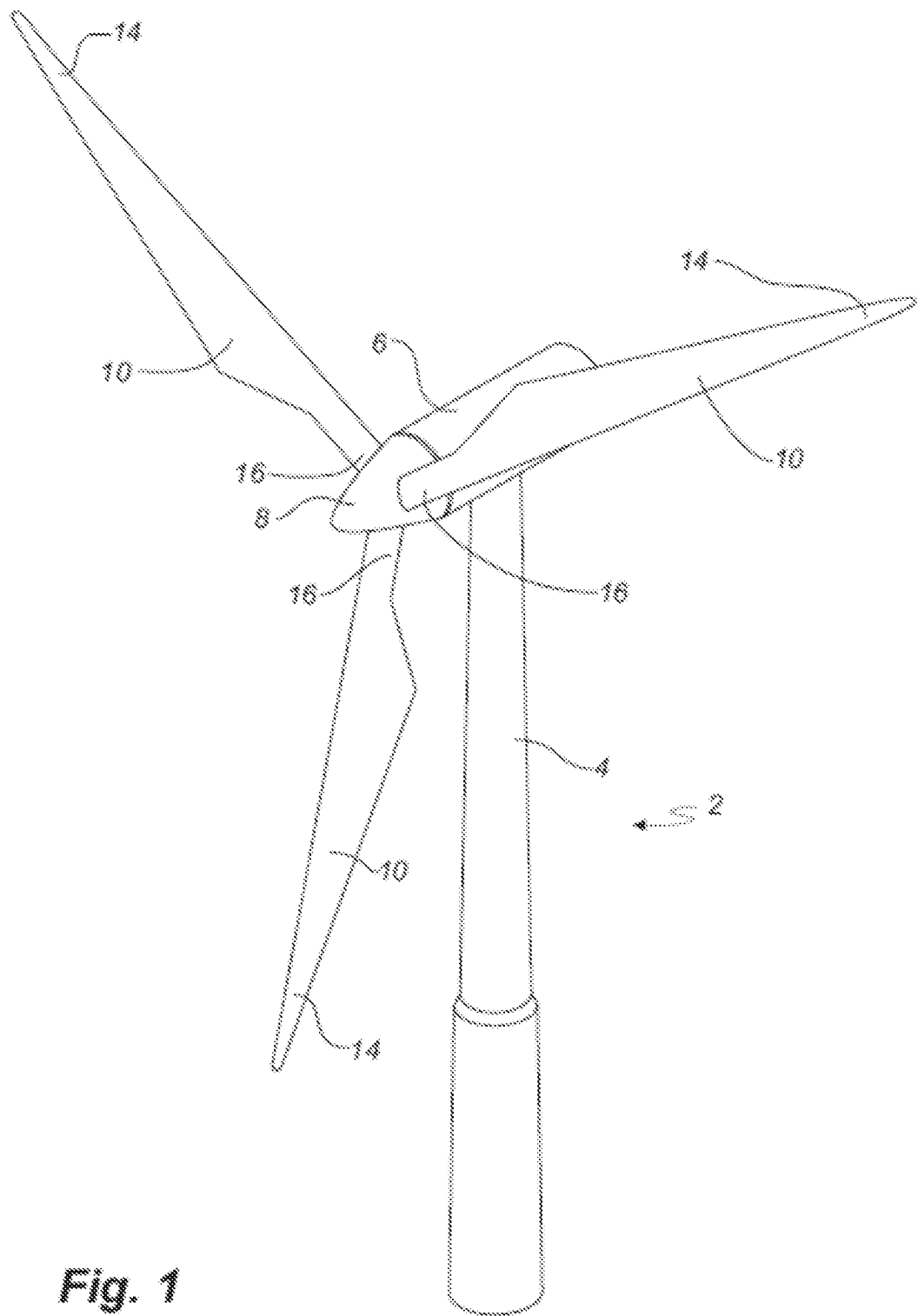
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
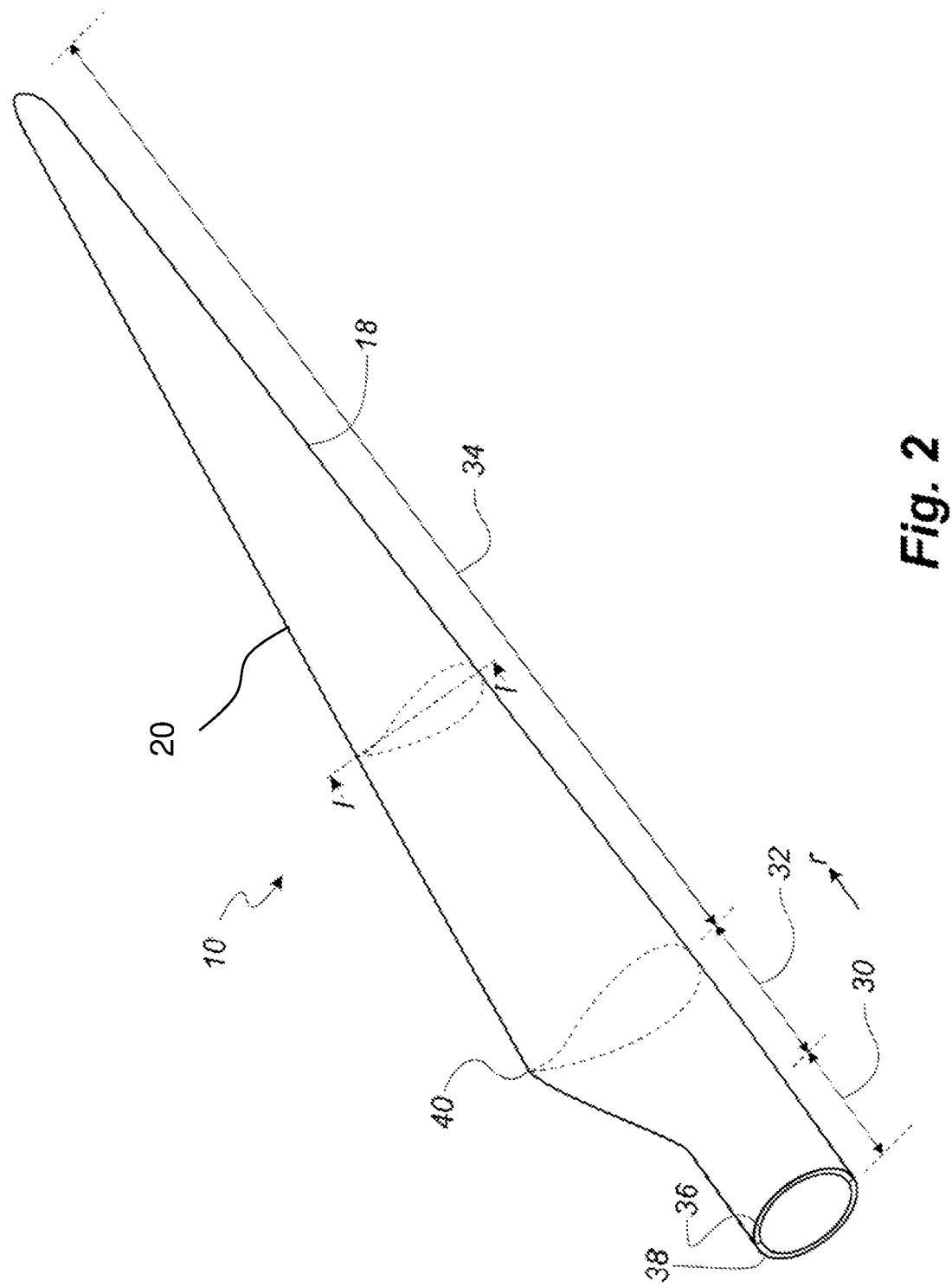
FIG. 2 is a schematic diagram illustrating an exemplary wind turbine blade.

FIG. 2 shows a schematic diagram illustrating a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
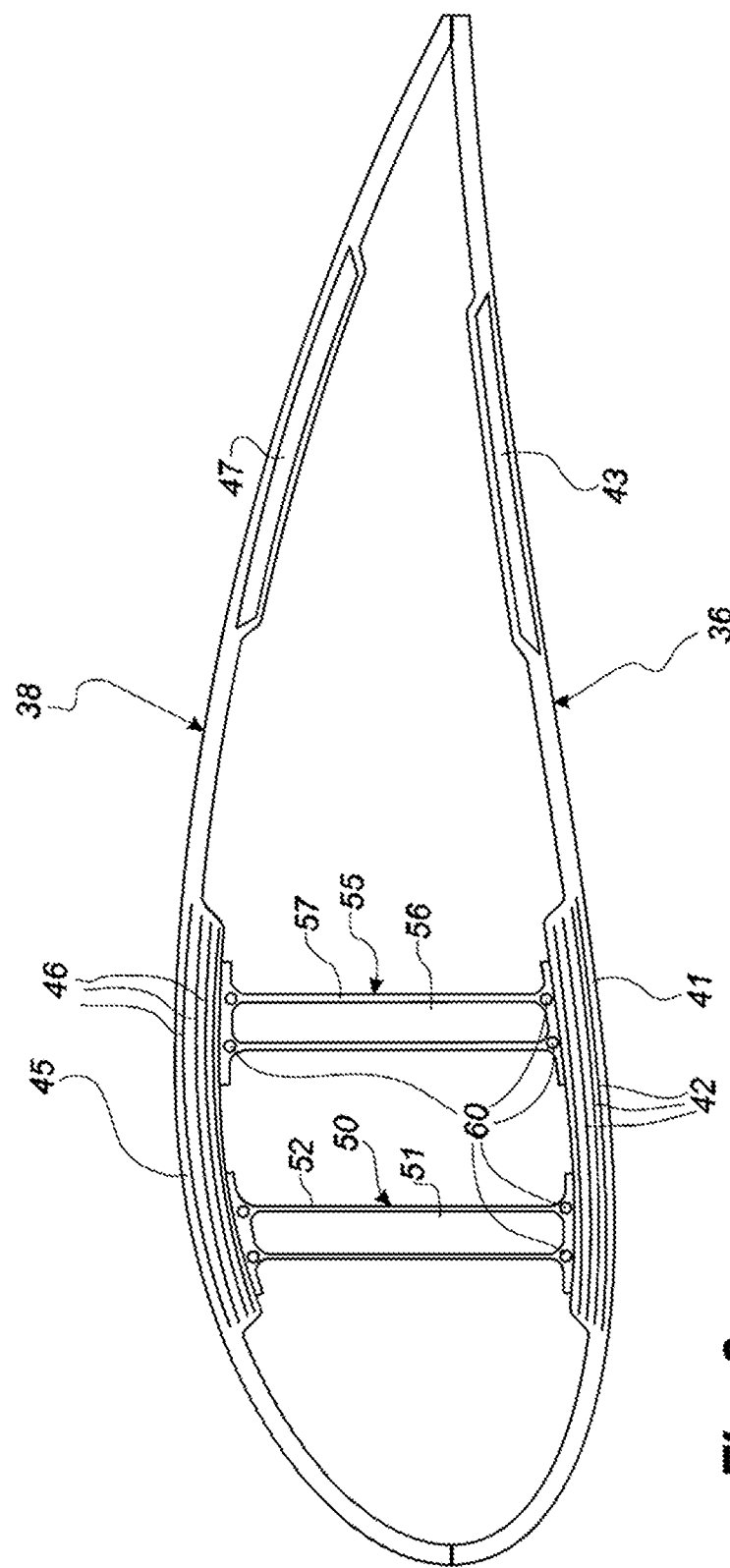
FIG. 3 is a schematic diagram illustrating a cross-section of an exemplary wind turbine blade.

FIG. 3 shows a schematic diagram illustrating a cross section of the blade along the line I-I shown in FIG. 2. As previously mentioned, the blade 10 may comprise a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers.

The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points. In order to compensate for this, a number of filler ropes 60 comprising glass fibres are normally arranged at these joint areas. Further, such ropes 60 may also facilitate transferring loads from the skin layers of the shear web body to the flanges. However, alternative constructional designs are possible.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

A shear web may extend throughout the majority of the length of the wind turbine blade. Thus, the shear web may exceed 70 meters in length. Consequently, the shear web mould needed to manufacture the shear webs may need to be more than 70 meters in length. To facilitate transportation and/or storage of such a shear web mould, it may be divided into several parts, i.e. mould parts, of approximately 10-12 metres in length, that are assembled together to form a complete e.g. >70-meter-long, shear web mould or mould system.

FIGS. 4-7 shows examples of mould parts and mould systems being configured for manufacture of a shear web for a wind turbine blade. However, it will be understood that the described concepts may be similarly applied to a mould system and/or mould parts being shaped for moulding other components of a wind turbine blade, such as a blade shell mould.

Figure 4:
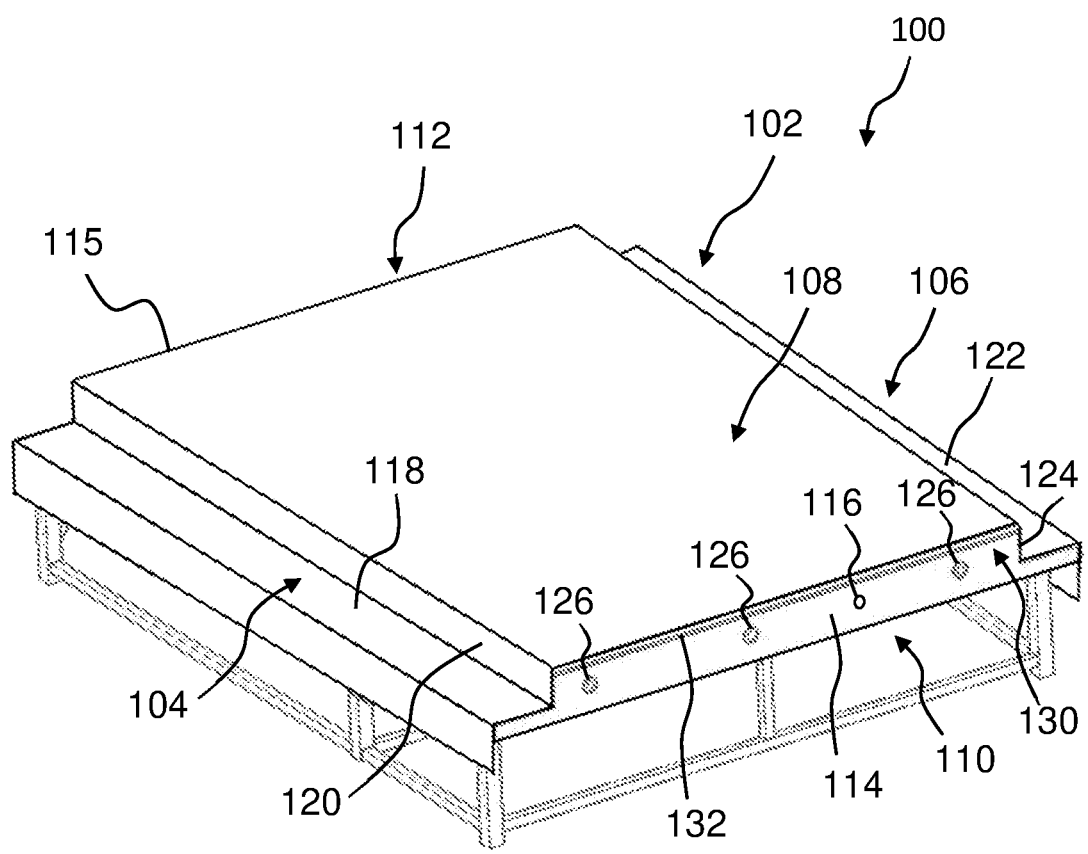
FIG. 4 is a schematic diagram illustrating an exemplary mould part.

FIG. 4 is a schematic diagram illustrating an exemplary mould part 100, such as a shear web mould part. The mould part 100 may be a first mould part and/or a second mould part of a mould system, such as a shear web mould system for manufacture of a shear web for a wind turbine blade.

The mould part 100 has a moulding surface 102. The moulding surface 102 is facing substantially upwards, such as to provide a surface for laying out components, such as glass-fibre for the shear web.

The moulding surface 102 comprises a primary side section 104, a secondary side section 106 and a central portion 108. The central portion 108 is between the primary side section 104 and the secondary side section 106. The central portion 108 is substantially flat. However, if the mould part 100 was supposed to be used for moulding of another component of the wind turbine blade, the central portion 108 may have been formed differently, e.g. the central portion may be curved, e.g. having a half-circular cross section.

The primary side section 104 comprises a primary base portion 118 and a primary ramp portion 120. The primary base portion 118 is substantially parallel to the central portion 108. The primary ramp portion 120 portion joins the central portion 108 and the primary base portion 118. The primary ramp portion 120 is non-parallel to the central portion 108. The primary base portion 118 and the central portion 108 are levelled differently and the primary ramp portion 120 joins the central portion 108 and the primary base portion 118. The primary ramp portion 120 may be substantially vertical.

The secondary side section 106 comprises a secondary base portion 122 and a secondary ramp portion 124. The secondary base portion 122 is substantially parallel to the central portion 108. The secondary ramp 124 portion joins the central portion 108 and the secondary base portion 122. The secondary ramp portion 124 is non-parallel to the central portion 108. The secondary base portion 122 and the central portion 108 are levelled differently and the secondary ramp portion 124 joins the central portion 108 and the secondary base portion 122. The secondary ramp portion 124 may be substantially vertical.

The mould part 100 has a primary connection interface 110 and a secondary connection interface 112. The secondary connection interface 112 is opposite the primary connection interface 110. The connection interfaces 110, 112 are configured to abut corresponding connection interfaces of other mould parts of a mould system. For example, the primary connection interface 110 is configured to abut a secondary connection interface 112' of a second mould part 100' (see FIG. 5).

For some mould parts, such as mould parts configured to form ends of a mould system, either the primary connection interface 110 or the secondary connection interface 112 may be omitted or be substituted with an end section.

The primary connection interface 110 comprises a primary connection surface 114. The primary connection surface 114 is substantially perpendicular to the moulding surface 102. The primary connection surface 114 is substantially perpendicular to a longitudinal direction of the mould part 100 and/or the mould system.

The primary connection interface 110 comprises an outlet 116. The outlet 116 extends through the primary connection surface 114. The outlet 116 is configured to be connected to a vacuum source, such as a compressor. By connecting the outlet 116 to a vacuum source, a low pressure may be applied between the mould parts. Thereby, the mould parts may be held together, and a tighter seal between the mould parts may be achieved, facilitating moulding of a higher quality shear web, and providing for a simpler and faster manufacturing process.

The primary connection interface 110 comprises a sealing path 130. The sealing path 130 may provide for adding a sealant, such as to provide for an air-tight (or near air-tight) seal between the primary connection surface 114 and a secondary connection surface of the second mould part. The sealing path 130 is surrounding the outlet 116. For example, the sealing path 130 is substantially following the perimeter of the primary connection surface 114. The sealing path 130 comprises a first sealing part 132. The sealing path 130 is described in more detail below, e.g. in relation to FIG. 6.

The primary connection interface 110 comprises one or more bolts and/or bolt holes 126. The bolts and/or bolt hoes may extend through the primary connection surface 114. The secondary connection interface 112 comprises corresponding bolts and/or bolt holes, which may extend through the secondary connection surface 115. Thus, the bolts and/or bolt holes are provided to attach a primary connection interface 110 of a first mould part to a secondary connection interface of a second mould part.

Figure 5:
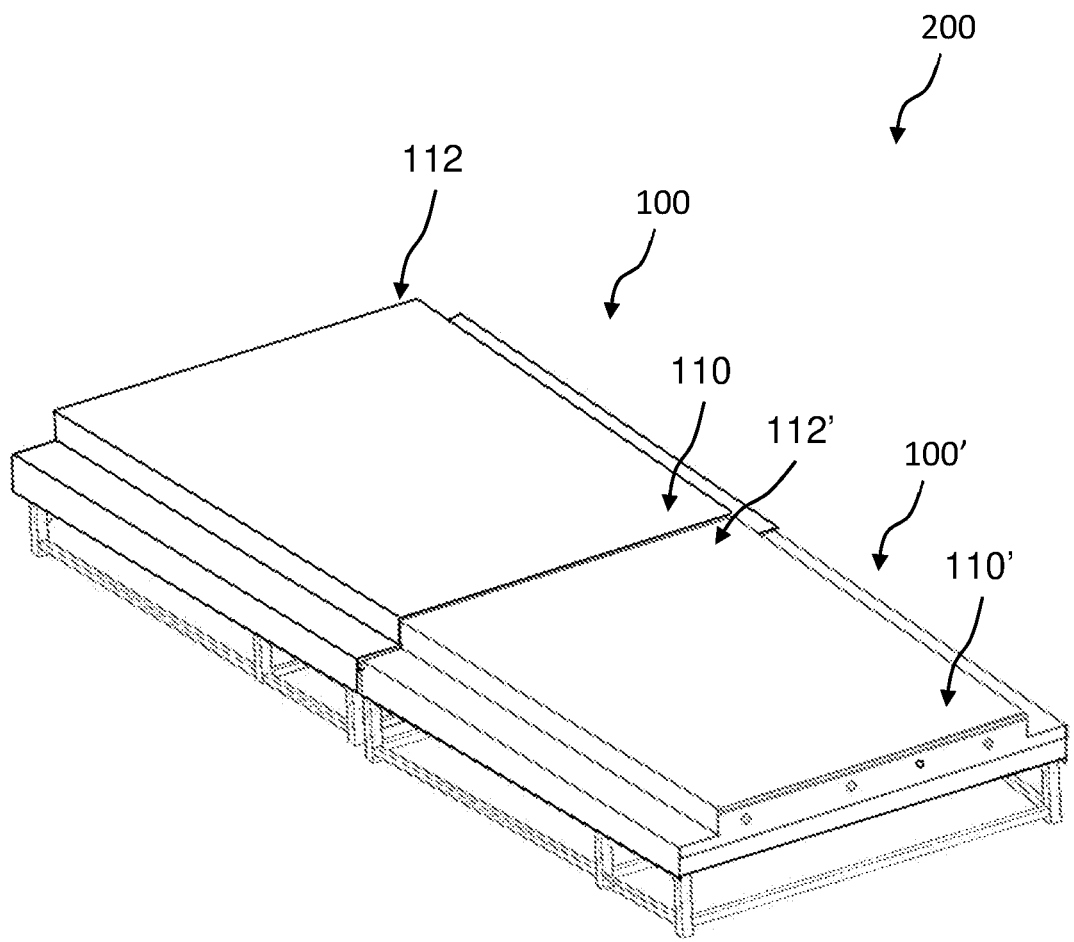
FIG. 5 is a schematic diagram illustrating an exemplary mould system.

FIG. 5 is a schematic diagram illustrating an exemplary mould system 200, such as a shear web mould system for manufacture of a shear web for a wind turbine blade. The mould system 200 comprises a first mould part 100 and a second mould part 100'. Although not illustrated, the mould system 200 may comprise more than two mould parts, such as three, four, five, six, seven, eight or more mould parts.

The first mould part 100 is described in more detail in relation to FIG. 4. The second mould part 100' may be similar to the first mould part 100 as described in more detail in relation to FIG. 4.

As seen, the primary connection interface 110 of the first mould part 100 is abutting and connection to the secondary connection interface 112' of the second mould part 100'.

A third mould part (not shown) may be connected to the first mould part 100 by connecting to the secondary connection interface 112 of the first mould part 100.

A fourth mould part (not shown) may be connected to the second mould part 100' by connecting to the primary connection interface 110' of the second mould part 100'.

Figure 6:
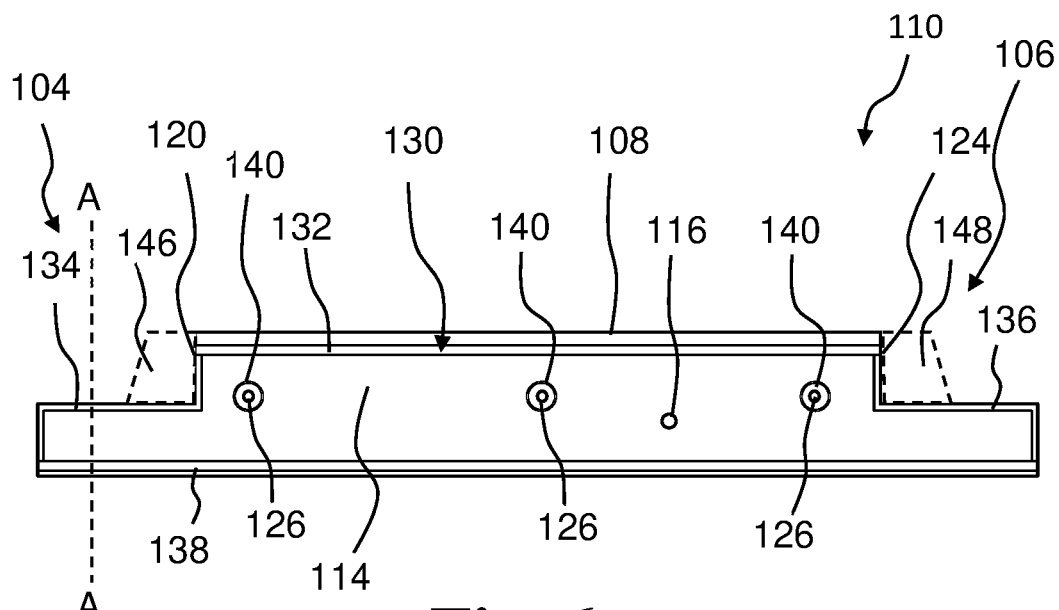
FIG. 6 is a schematic diagram illustrating an exemplary connection interface.
Figure 7:
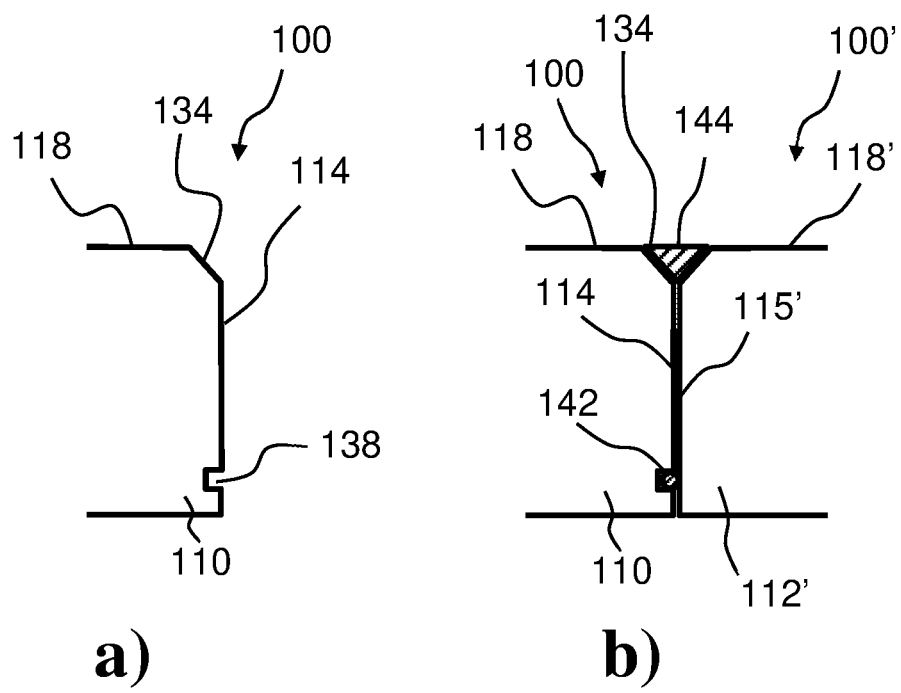
FIG. 7 is a schematic diagram illustrating exemplary connection interfaces.

FIG. 6 is a schematic diagram illustrating an exemplary connection interface,

The primary connection interface 110 comprises a sealing path 130. The sealing path 130 is surrounding the outlet 116. For example, the sealing path 130 is substantially following the perimeter of the primary connection surface 114.

The sealing path 130 comprises a first sealing part 132. The first sealing part 132 comprises a recess for receiving a gasket material. The first sealing part 132 is substantially parallel to the central portion 108. The first sealing part is extending from the primary side section 104 to the secondary side section 106, such as from the primary ramp portion 120 to the secondary ramp portion 124. The first sealing part 132 is offset from the central portion 108, e.g. by a distance between 1-50 mm. The offset may provide for a better seal, in particular when using a gasket material.

The sealing path 130 comprises a second sealing part 134. The second sealing part 134 is formed by a bevelled edge between the moulding surface and the primary connection surface 114, such as between the primary side section 104 and the primary connection surface 114, as shown. The second sealing part 134, e.g. by the bevelled edge, is configured for receiving a sealant paste.

The sealing path 130 comprises a third sealing part 136. The third sealing part 136 is formed by a bevelled edge between the moulding surface and the primary connection surface 114, such as between the secondary side section 106 and the primary connection surface 114, as shown. The third sealing part 136, e.g. by the bevelled edge, is configured for receiving a sealant paste.

The sealing path 130 comprises a fourth sealing part 138. The fourth sealing part 138 comprises a recess for receiving a gasket material. The fourth sealing part 138 is substantially parallel to the central portion 108. The fourth sealing part 138 is extending from the primary side section 104 to the secondary side section 106. The fourth sealing part 138 is offset from a bottom perimeter of the primary connection surface 114, e.g. by a distance between 1-50 mm. The offset may provide for a better seal, in particular when using a gasket material.

The primary connection interface comprises fifth sealing part(s) 140. The fifth sealing part(s) 140 is surrounding the bolt and/or bolt holes 126. The fifth sealing part(s) may prevent leakage through the bolt holes.

FIGS. 7a and 7b are schematic diagrams illustrating exemplary connection interfaces.

FIG. 7a is a cross-sectional view of the primary connection interface 110 of FIG. 6, along line A-A. As shown, the second sealing part 134 is formed by a bevelled edge between the primary side section, such as the primary base portion 118, and the primary connection surface 114. Also, as shown, the fourth sealing part 138 comprises a recess for receiving a gasket material. It is further illustrated that the fourth sealing part 138 is offset from a bottom perimeter of the primary connection surface 114.

FIG. 7b shows the primary connection interface 110 of FIG. 7a, such as of a first mould part 100, being connected to a secondary connection interface 112' of a second mould part 100'.

A gasket material 142 is applied in the recess formed by the fourth sealing part 138. As illustrated, a secondary connection interface, such as the secondary connection interface 112' of the second mould part 100' need not have a sealing part to receive the gasket material 142. However, in other exemplary mould parts the secondary connection interface may be provided with a sealing part to receive a gasket material.

A sealant paste 144 is applied in the recess formed by the bevelled edge of the second sealing part 134. As illustrated a secondary connection interface, such as the secondary connection interface 112' of the second mould part 100' may be provided with a bevelled edge to receive the sealing paste 144. In other exemplary mould parts, the secondary connection interface may be provided without the bevelled edge. In other exemplary mould parts, the primary connection interface may be provided without the bevelled edge. Hence, it will be understood that the bevelled edge may be provided in either one or both of the connection interfaces to form the recess for receiving the sealant paste 144.

Figure 8:
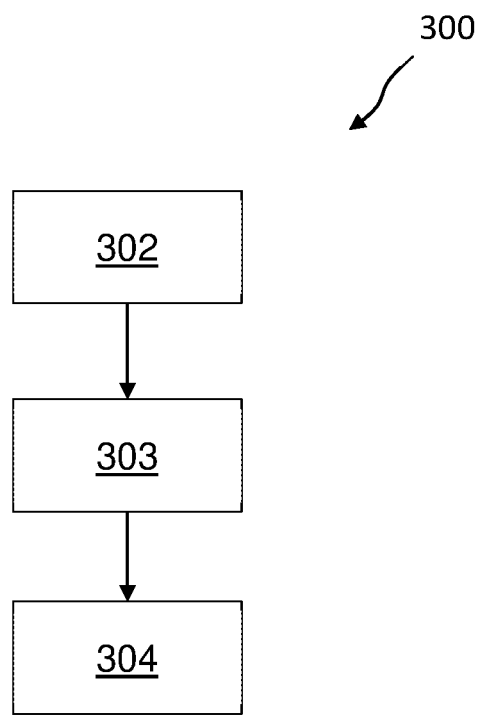
FIG. 8 is a flow chart of an exemplary method.

FIG. 8 is a flow chart of an exemplary method 300, such as a method for assembling a mould system for manufacture of component, such as a shear web or a shell part, for a wind turbine blade, such as the mould system 200 as described above comprising a first mould part 100 and a second mould part 100'.

The method 300 comprises positioning 302 the first mould part and the second mould part such that a primary connection interface of the first mould part, e.g. a first primary connection interface, abuts a secondary connection interface of the second mould part, e.g. a second secondary connection interface.

The method further comprises applying 303 a sealant paste to a sealing part of the sealing path forming a bevelled edge between the first moulding surface and the first primary connection surface and/or between the second moulding surface and the second secondary connection surface. For example, the sealant paste may be applied 303 to the second sealing part and/or the third sealing part of the sealing path as described above.

The method further comprises applying 304 a first negative pressure to an outlet of the first mould part, e.g. a first outlet, by a vacuum source.

The mould system may be used for vacuum assisted resin transfer moulding (VARTM) of the component, e.g. by applying a second negative pressure between a sealing layer and the moulding surfaces of the mould parts, such as a first moulding surface of the first mould part and a second moulding surface of the second mould part.

The first negative pressure applied 304 to the outlet may be lower than the second negative pressure used in the VARTM process. Thereby it may be ensured that if there is a leak in the interfaces between mould parts, resin is entering the interface rather than air entering into the moulding process.

The invention has been described with reference to a preferred embodiment. However, the scope of the invention is not limited to the illustrated embodiment, and alterations and modifications can be carried out without deviating from the scope of the invention.

LIST OF REFERENCES 2 wind turbine
4 tower
6 nacelle
8 hub
10 blade
14 blade tip
16 blade root
18 leading edge
20 trailing edge
30 root region
32 transition region
34 airfoil region
36 pressure side shell
38 suction side shell
40 shoulder
41 spar cap
42 fibre layers
43 sandwich core material
45 spar cap
46 fibre layers
47 sandwich core material
50 first shear web
51 sandwich core material
52 skin layers
55 second shear web
51 sandwich core material
52 skin layers
55 second sear web
56 sandwich core material
57 skin layers
60 filler ropes
100 shear web mould part
102 moulding surface
104 primary side section
106 secondary side section
108 central portion
110 primary connection interface
112 secondary connection interface
114 primary connection surface
115 secondary connection surface
116 outlet
118 primary base portion
120 primary ramp portion
122 secondary base portion
124 secondary ramp portion
126 bolt(s)
128 bolt hole(s)
130 sealing path
132 sealing part
134 second sealing part
136 third sealing part
138 fourth sealing part
140 fifth sealing part(s)
142 gasket material
144 sealing paste
146 primary mould insert
148 secondary mould insert
200 shear web mould system
300 method
302 positioning first mould part and second mould part
303 applying sealant paste
304 applying first negative pressure

The invention claimed is:

1. A method for assembling a mould system for manufacture of a component for a wind turbine blade, the mould system comprising:
a first mould part having a first moulding surface with a first primary side section a first secondary side section and a first central portion between the first primary side section and the first secondary side section, the first mould part having a first primary connection interface comprising a first primary connection surface, the first primary connection interface comprising a first outlet configured to be connected to a vacuum source; and
a second mould part having a second moulding surface with a second primary side section a second secondary side section and a second central portion between the second primary side section and the second secondary side section, the second mould part having a second secondary connection interface comprising a second secondary connection surface,
wherein the first primary connection interface and/or the second secondary connection interface comprises a sealing path configured for surrounding the first outlet, and wherein the sealing path comprises a sealing part formed by a bevelled edge between the first moulding surface and the first primary connection surface and/or between the second moulding surface and the second secondary connection surface,
the method comprising:
positioning the first mould part and the second mould part such that the first primary connection interface abuts the second secondary connection interface;
applying a sealant paste to the sealing part of the sealing path; and
applying a first negative pressure to the first outlet by the vacuum source.

2. A method for manufacture of a component for a wind turbine blade comprising:
positioning a first mould part and a second mould part such that a first primary connection interface of the first mould part abuts a second secondary connection interface of the second mould part, wherein the first mould part has a first moulding surface and the second mould part has a second moulding surface;

arranging at least one fibre layer on the first moulding surface and the second moulding surface;

positioning a sealing layer on top of the first moulding surface and the second moulding surface to cover the at least one fibre layer;

applying a first negative pressure between the first primary connection interface and the second secondary connection interface;

performing vacuum assisted resin transfer moulding (VARTM) by applying a second negative pressure between a sealing layer and the first moulding surface and the second moulding surface to form a component for a wind turbine blade, wherein the first negative pressure is lower than the second negative pressure; and curing the component for the wind turbine blade.

3. The method according to claim 2, wherein the first negative pressure is a predetermined fraction of the second negative pressure.

4. The method according to claim 3, wherein the predetermined fraction is between 10-70 percent.

5. The method according to claim 2, wherein the second negative pressure is between 10-500 mbar.

6. The method according to claim 2, wherein the first negative pressure is between 0.1-200 mbar.

* * * * *